United States Patent
Vecchiarelli et al.

(10) Patent No.: US 11,638,896 B2
(45) Date of Patent: May 2, 2023

(54) METHOD TO SEPARATE A GAS MIXTURE ON A LARGE SCALE USING REVERSIBLE BLOWERS

(71) Applicants: Lea Rose Vecchiarelli, Colts Neck, NJ (US); ADSORPTECH LLC, Middlesex, NJ (US); Apurva Maheshwary, Edison, NJ (US); John Robert Ambriano, Hockessin, DE (US); James Joseph Flaherty, Hampton, NJ (US)

(72) Inventors: Lea Rose Vecchiarelli, Colts Neck, NJ (US); Apurva Maheshwary, Edison, NJ (US); John Robert Ambriano, Hockessin, DE (US); James Joseph Flaherty, Hampton, NJ (US)

(73) Assignee: ADSORPTECH LLC ( * ) Notice: Subject to any disclaimer, the term of this patent is extended or adjusted under 35 U.S.C. 154(b) by 156 days.

(21) Appl. No.: 16/656,678

(22) Filed: Oct. 18, 2019

(65) Prior Publication Data
US 2021/0113953 A1    Apr. 22, 2021

(51) Int. Cl.
B01D 53/053    (2006.01)
B01D 53/047    (2006.01)

(52) U.S. Cl.
CPC ....... *B01D 53/0476* (2013.01); *B01D 53/053* (2013.01); *B01D 2256/12* (2013.01); *B01D 2259/402* (2013.01); *B01D 2259/40005* (2013.01); *B01D 2259/4146* (2013.01)

(58) Field of Classification Search
CPC .......... B01D 53/047; B01D 53/0476; B01D 53/053; B01D 2256/10; B01D 2256/12; B01D 2257/104; B01D 2259/40005; B01D 2259/402; B01D 2259/4146
USPC ................ 95/96; 96/121, 115, 116, 113, 132
See application file for complete search history.

(56) References Cited

U.S. PATENT DOCUMENTS

| | | | | |
|---|---|---|---|---|
| 5,968,236 A * | 10/1999 | Bassine | ............. | B01D 53/0446 96/130 |
| 7,114,932 B1 * | 10/2006 | Bassine | ................... | F04C 18/44 418/268 |
| 2008/0000353 A1 * | 1/2008 | Rarig | ................... | B01D 53/047 95/100 |
| 2010/0095841 A1 * | 4/2010 | Naheiri | ............. | B01D 53/0476 95/26 |
| 2011/0315009 A1 * | 12/2011 | Ambriano | .......... | B01D 53/0476 95/26 |

* cited by examiner

*Primary Examiner* — Frank M Lawrence, Jr.

(57) ABSTRACT

The present invention provides for a method utilizing horizontal and vertical Adsorber bed(s) with multiple different reversible blower(s) and inputs operating in a vacuum pressure swing adsorption separation process to separate gases. The process is designed to provide a safer and more cost-effective adsorption system on a larger scale that captures and utilizes energy typically wasted during equipment transitions thereby achieving overall higher power efficiency.

5 Claims, 4 Drawing Sheets

Process variation with two horizontal beds each connected to two blowers.

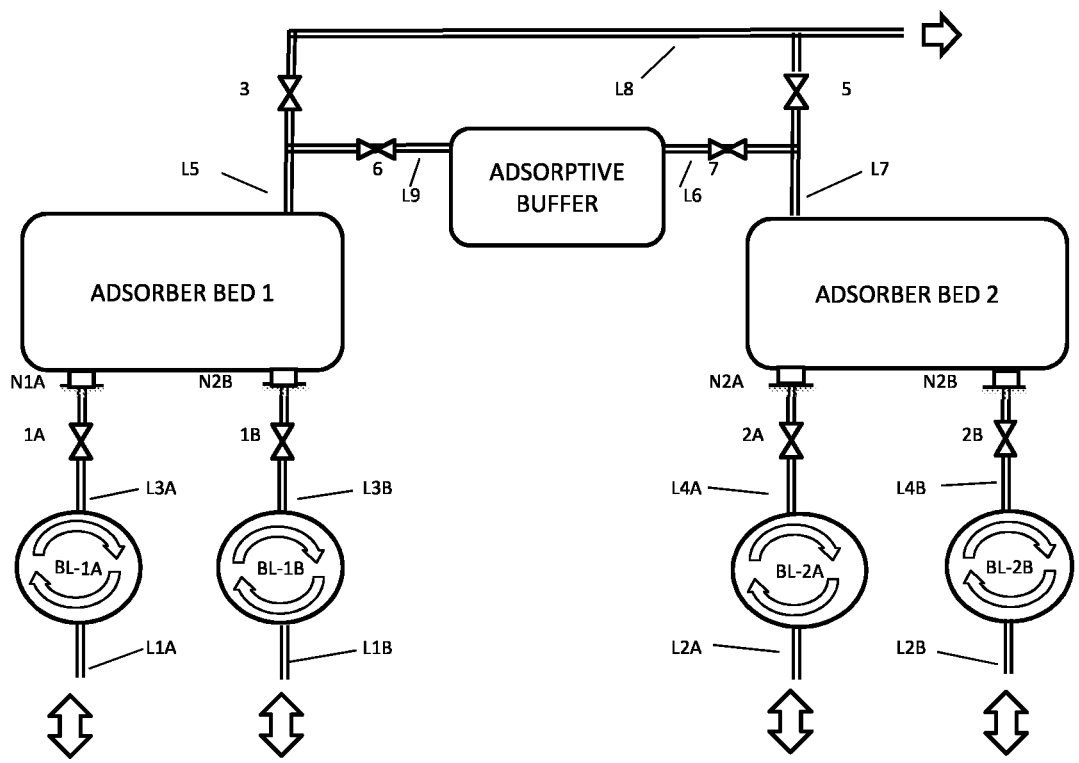
FIG. 1 Process variation with two horizontal beds each connected to two blowers.

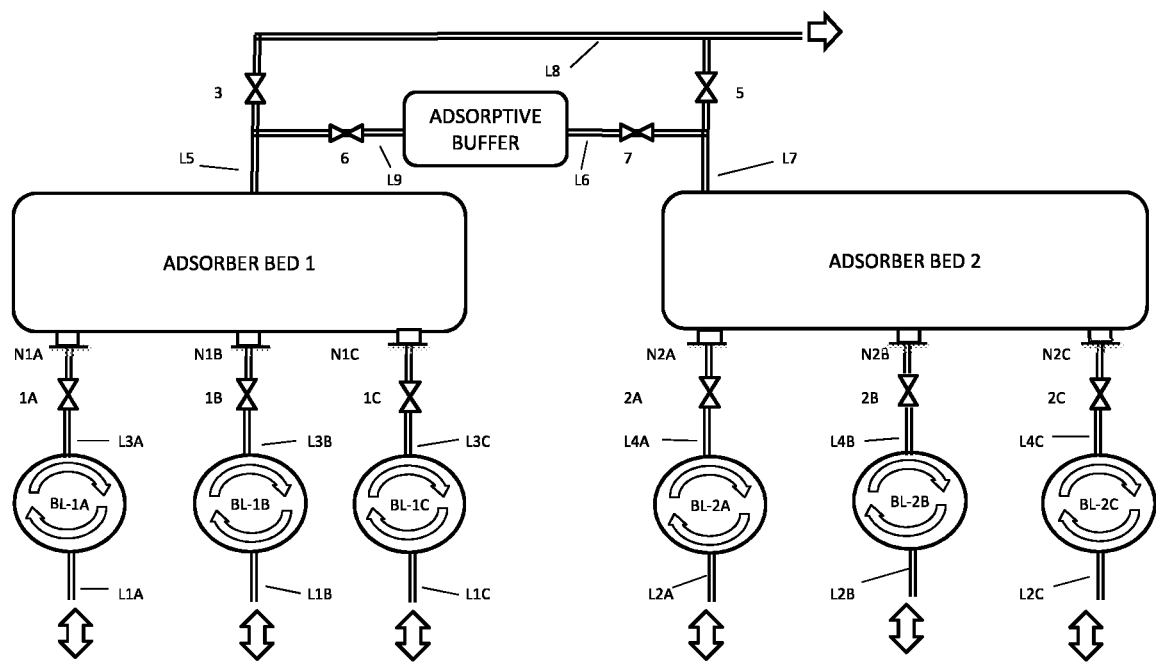
FIG. 2  Process variation with two horizontal adsorber beds each connected to three blowers.

FIG. 3  Concept of horizontal bed with multiple feed inlets
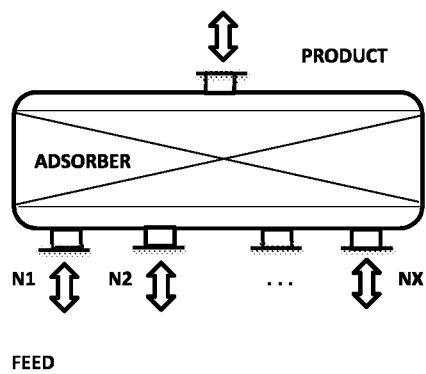

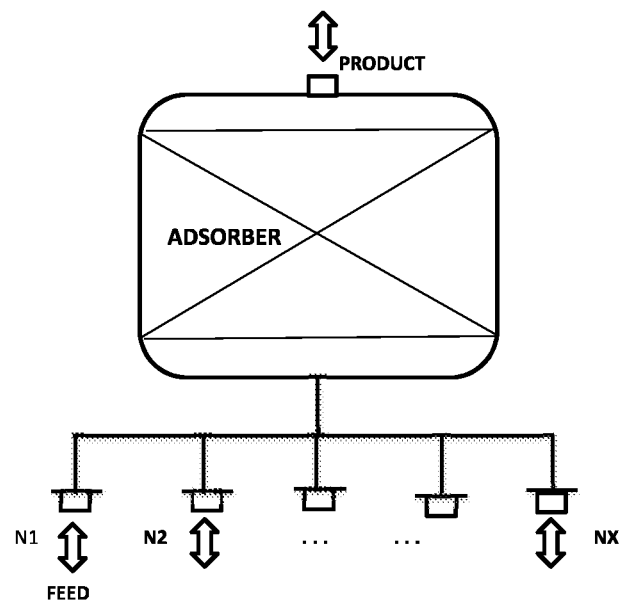
FIG. 4 Concept of vertical bed with multiple feed inlets

METHOD TO SEPARATE A GAS MIXTURE ON A LARGE SCALE USING REVERSIBLE BLOWERS

FIELD OF THE INVENTION

The present invention relates to a process for purifying gases from a mixture of gases, using cyclic vacuum pressure swing adsorption (VPSA) that uses Adsorber bed(s) and reversible blower(s). The Adsorber bed(s) are connected to dedicated parallel reversible blower(s), which are used to pressurize and evacuate the beds at fixed and/or variable speeds and times. The process can be extended to a single Adsorber bed or multiple Adsorber beds. These Adsorber bed(s) can be of any geometric configuration including vertical and horizontal.

BACKGROUND OF THE INVENTION

Cyclic adsorption processes are frequently used to separate the components of a gas mixture, typically using one or more adsorber vessels that are packed with a particulate adsorbent material which adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out. In any cyclic adsorption process, the adsorber bed has a finite capacity to capture a given gaseous component and therefore the adsorbent requires periodic regeneration to restore its adsorption capacity. The procedure followed for regenerating the adsorbent varies according to the process. In VPSA processes, the adsorbent is at least partially regenerated by creating a vacuum in the adsorber vessel thereby causing adsorbed components to be desorbed from the adsorbent. Also the adsorption step is carried out at a pressure higher than the regeneration step.

A typical VPSA process, such as detailed in U.S. Pat. No. 5,122,164 comprises a series of five basic steps that includes (i) Pressurization of the bed to the required pressure, (ii) Production of the product gas, (iii) Evacuation of the bed, (iv) Purging the bed with product gas under vacuum conditions and (v) Pressure equalization step to minimize vent losses and improve efficiency.

As mentioned above, the regeneration process includes a purge step during which a gas stream that is depleted in the component to be desorbed is passed counter-currently through the adsorber bed thereby reducing the partial pressure of adsorbed component, which in turn causes additional adsorbed component to be desorbed from the adsorbent. The non-adsorbed gas product may be used to purge the adsorber beds since this gas is usually quite depleted in the adsorbed component of the feed gas mixture. It often requires a considerable quantity of purged gas to adequately regenerate the adsorbent. For example, it is not unusual to use half of the non-adsorbed product gas produced during the previous production step to restore the adsorbent to the desired extent.

Further process improvements have been made to this simple cycle design in order to reduce power consumption, improve product recovery and purity, lower capital cost and increase product flow rate. These have included multi-bed processes, single column rapid pressure swing adsorption and more recently piston driven rapid pressure swing adsorption. The trend toward shorter cycle times is driven by the desire to design more compact processes with lower capital costs and lower power requirements.

One of the improvements was made in U.S. Pat. No. 5,679,134 which suggested using a single bed with a reversible blower to reduce the complexity of the process. In U.S. Pat. No. 5,906,674 a tank was used to store low purity purge gas to improve the productivity of the process.

A further improvement to the process as described in U.S. Pat. No. 5,679,134 was made in the U.S. Pat. No. 8,545,603 which provided a more practical and energy efficient method for separation of gases using reversible blowers.

The further investigation and commercial utilization of the prior art as described in U.S. Pat. No. 8,545,603 highlighted a deficiency which made it difficult for use in the industry on a larger scale. The present invention, in distinction from the prior art, provides a method to significantly upscale this process, enabling design of large-scale commercial plants using reversible blowers. It also provides a new method to store purge and equalization gas to improve process efficiency using an adsorptive buffer vessel.

SUMMARY OF THE INVENTION

The present invention provides a method for integrating Adsorber bed(s) of either horizontal, or vertical configuration with the VPSA process and dedicated parallel reversible blower(s) on each bed. The process may also use an adsorptive buffer vessel to store purge and equalization gas to improve the process efficiency. As such, the process can be used to separate any gas mixture and specifically but not limited to oxygen gas from air.

BRIEF DESCRIPTION OF THE DRAWINGS

FIG. 1 is the process variation with two horizontal beds each connected to two blowers.

FIG. 2 is the process variation with two horizontal beds each connected to three blowers.

FIG. 3 is a concept of horizontal bed with multiple feed inlets.

FIG. 4 is a concept of vertical bed with multiple feed inlets.

For FIGS. 1-4 please use the following key/legend that describes the characters and acronyms used:

BL-#X Where BL represents a blower, # represents the number of the adsorber bed that the blower is attached to (1, 2 or 3), and X differentiates the two blowers for the same adsorber bed as either A, B or C.

L #X Where L represents the pipe line, # represents the pipe line grouping number (1, 2, 3 or 4), and X represents differentiates the line number to the corresponding blower number (A, B or C).

N #X Where N represents the feed inlets to the adsorber bed, # represents the number of the feed inlet into the bed (1, 2 or 3) and X differentiates the nozzles for the corresponding blower and pipe lines (A or B).

N # Where N represents the feed inlets to the adsorber bed, and # represents the number of feed inlet into the bed (1—any number amount of "X").

\# Where # represents the valve number.

X Is used to label the valves connecting the beds to the blowers. Where # represents the adsorber bed number and X represents the corresponding blower designation.

DETAILED DESCRIPTION OF THE INVENTION

The present invention provides for an improved VPSA (vacuum pressure swing adsorption) process for separating a gas from a mixture of gases on a larger scale in single or multiple adsorption beds either vertical or horizontal wherein each bed undergoes a process cycle comprising the steps of (1) evacuating the spent bed using two or more parallel blowers being used to generate vacuum; (2) purging the spent bed using the vacuum and a slip stream of product gas from the producing bed; (3) feeding the mixture of gases to the producing bed with two or more blowers running in opposite direction with respect to the blowers running to generate vacuum on the spent bed; (4) producing purified product gas from the producing bed; and (5) pressure equalizing the two beds, concurrently changing directions on all the blowers.

The present inventors anticipate two horizontal or vertical beds in the process as shown in FIG. 1 and FIG. 2. There will be two or more reversible blowers attached to each of the beds. The reversible blowers are connected to their individual motors. The connection of the blowers to the beds is made to minimize the flow variation across the bottom section of the bed. The inventors also anticipate running two or more connected blowers to the beds at different speeds in order to achieve best possible flow distribution across each of the beds. It is also anticipated that each of the beds may be operated as a single bed process using the adsorptive buffer.

The process described in FIG. 1 is as followed. The Blowers "BL-1A" and "BL-1B" get the feed gas and rejects waste through line "L1A" and "L1B" respectively. In the present inventions' embodiment this feed gas is Air and waste is Nitrogen rich gas. The feed gas from "BL-1A" and "BL-1B" are fed to the "ADSORBER BED 1" through lines "L3A" and "L3B" and valves "1A" and "1B". The purified gas product which is oxygen (O2) in the present embodiment is obtained from the product side of "ADSORBER BED 1". The gas product is withdrawn from the process through line "L5" and valve "3" and line "L8". During purge and equalization steps the product gas will be diverted to the "ADSORPTIVE BUFFER" through the valves "6" and line "L9". Also during the regeneration part of the cycle the purge gas will be received from tank "ADSORPTIVE BUFFER" through valve "7" and line "L6" from "ADSORBER BED 2".

The Blowers "BL-2A" and "BL-2B" get the feed gas and rejects waste through line "L2A" and "L2B" respectively. In the present inventions' embodiment this feed gas is Air and waste is Nitrogen rich gas. The feed gas from "BL-2A" and "BL-2B" are fed to the adsorber bed "ADSORBER BED 2" through lines "L4A" and "L4B" and valves "2A" and "2B". The purified gas product which is oxygen (O2) in the present embodiment is obtained from the product side of "ADSORBER BED 2". The gas product is withdrawn from the process through line "L7" and valve "5" and line "L8". During purge and equalization steps the product gas will be diverted to the equalization tank "ADSORPTIVE BUFFER" through the valves "7" and line "L6". Also during the regeneration part of the cycle the purge gas will be received from tank "ADSORPTIVE BUFFER" through valve "6" and line "L9" from "ADSORBER BED 1".

The present invention provides that the claimed process can be operated in a nominal full cycle timing 20 seconds to 300 seconds, most preferably between 30 seconds and 120 seconds.

The process includes an optional product buffer tank which may be beneficial to achieve better mixing and more uniform product purity and pressure.

The present invention required the process to be operated at a typical maximum feed pressure of between 12 psia to 30 psia, most preferably between 8 psia and 5 psia. The minimum pressure in the process is also preset with a controller and can be controlled either by changing the speed of blowers or the cycle step times.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

The invention claimed is:

1. An apparatus for producing oxygen comprising: two adsorber beds each connected to two or more flow balanced reversible blowers through isolation valves, an equalization line with an adsorptive buffer vessel, and two product valves; and wherein a control method actuates rotating of said blowers sequentially in clockwise and anticlockwise directions to supply air to the inlet of one bed while regenerating the other bed by removing adsorbed nitrogen using a vacuum.

2. The apparatus of claim 1, further comprising variable drives on each of the reversible blowers.

3. The apparatus of claim 1, with inlet valves located to achieve even flow distribution.

4. The apparatus of claim 1, which has adsorber beds that include two or more blowers where the blowers are configured to operate at different speeds to achieve and even flow distribution.

5. The apparatus of claim 1, further configured to maintain a preset maximum pressure and preset minimum pressure by varying machine speeds and operating at fixed cycle step times.

* * * * *